July 15, 1947.  A. A. A. A. DE GRAMONT  2,424,011
TELESCOPE ADJUSTING DEVICE
Filed Aug. 17, 1945
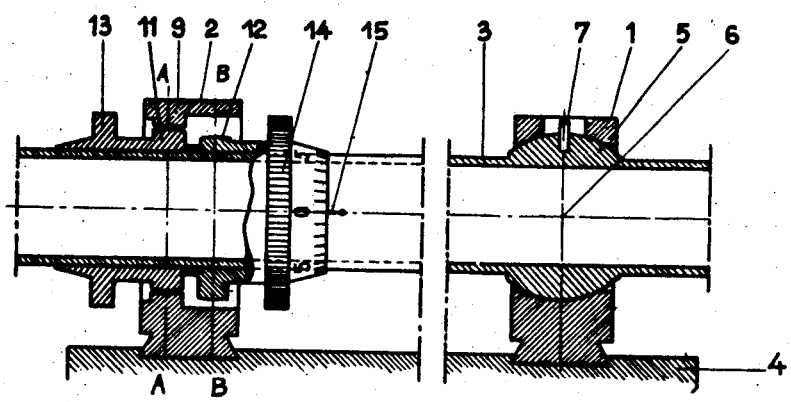
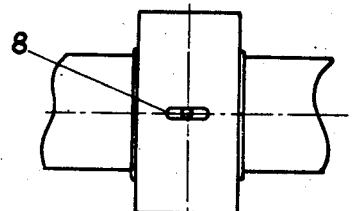
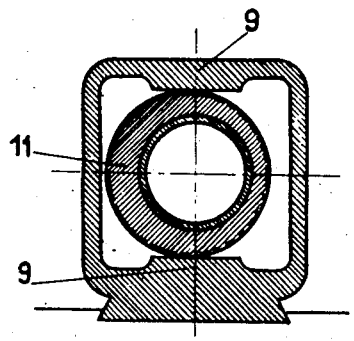     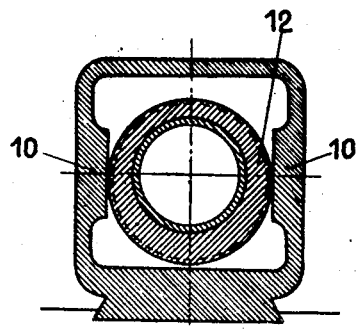
Inventor
A.A.A.A. De Gramont Patented July 15, 1947

2,424,011

UNITED STATES PATENT OFFICE 2,424,011

TELESCOPE ADJUSTING DEVICE

Armand Antoine Auguste Agénor de Gramont, Levallois-Perret, France, assignor to Optique et Precision de Levallois, Levallois-Perret, France, a company of France Application August 17, 1945, Serial No. 611,064
In France April 11, 1945

6 Claims. (Cl. 248—178)

The present invention pertains to the adjustment in the orientation of telescopes along two directions at right angles; for example the adjustment in altitude and in azimuth.

When a telescope has to remain perfectly fluid-tight, the adjusting means used up to the present day, by a displacement of the cross-lines or by making eccentric an inner part of the telescope, were difficult to carry out into practice.

Moreover, the usual adjusting means operating by outer mechanisms involving the use of screws and nuts or cams, require retracting springs which are of doubtful safety as regards the constancy of adjustment, in particular when applied to laying telescopes subjected to shocks, such as ordnance telescopes.

According to the present invention, the telescope which is movable about the centre of a sphere located in its axis, carries two independently actuated eccentric rings which are movable about its axis and each confined, without play, within two parallel surfaces, the two sets of parallel surfaces being at right angles to one another.

Such an arrangement, some of the features of which will be indicated hereinafter, is remarkable by the simplicity and robustness of its parts. The two controls are irreversible and do not react the one on the other, the two milled wheels which ensure such controls are concentric with the telescope tube. Lastly, there are no springs, and the axis of the telescope is rigidly held on its support.

A form of embodiment of the adjusting device according to the invention will now be described by way of example in reference to the accompanying drawing in which:

Fig. 1 is an elevational section of the device as a whole, along the axis of the telescope.

Fig. 2 is an outside view, from above, of the parts preventing the telescope from rotating about its axis.

Figs. 3 and 4 are transverse sections respectively taken along the lines AA and BB of Fig. 1.

Two supporting collars 1 and 2 are arranged, one in front, the other at the rear, of the telescope 3; they are firmly secured to the fixing plate 4.

The collar 1 comprises a spherical recess in which is centered the spherical ball 5 of the tube 3, thereby fixing the longitudinal position of the telescope and enabling it to oscillate about the centre 6 located on the telescope axis. A pin 7 secured in the axis of the bulge 5 and enclosed in the notch 8 (Fig. 2) of the collar 1 prevents the telescope from rotating about its axis without hindering it in its movements within the prescribed limits for adjusting purposes.

The square-shaped collar 2 comprises on one side (Fig. 3) two bosses 9 disposed on the vertical axis and two bosses 10 disposed on the horizontal axis, between which are respectively lodged, without any play, the eccentrics 11 and 12 integral with the milled wheels 13 and 14 which are centered and idly mounted on the telescope tube. The bosses 9 are limited by two parallel horizontal surfaces (for the adjustment in altitude) and the bosses 10, by two parallel vertical surfaces (for the azimuth adjustment).

It is seen that when the milled wheel 13 is rotated, the position of the tube varies in altitude, but this tube does not move sideways since it is guided by the eccentric 12 which slides between the bosses 10; and conversely, when the milled wheel 14 is rotated, the telescope moves sideways in azimuth, the eccentric 11, which slides between the bosses 9, preventing the tube from moving in altitude.

Graduations for adjustment purposes may be arranged on the conical portions of the milled wheels and may be read in conjunction with indexes, such as 15, engraved in the telescope tube.

I claim:

1. Telescope adjusting device comprising two eccentric members mounted on the telescope tube and rotatable thereon, each eccentric member being confined between two stationary parallel surfaces, the two sets of parallel surfaces being in planes at right angles to one another.

2. In a telescope, adjusting means comprising, in combination, a ball and socket mounting on which one end of the telescope tube is movably mounted, two eccentric rings carried by the telescope tube at the other end and adapted to be rotated about the tube axis, each of said eccentric rings being confined, without play, between two parallel surfaces, the two sets of parallel surfaces being disposed at right angles to one another, and means for actuating said eccentrics independently of one another.

3. In a telescope, adjusting means comprising, in combination, a front collar secured to a support and forming a socket accommodating a spherical sleeve surrounding the telescope tube, a rear collar mounted on said support and provided with two sets of two parallel bosses each set being at right angles in relation to the other set, two eccentric rings idly mounted on said telescope tube and each being confined between one set of parallel bosses and means for actuating the said eccentric rings independently of one another.

4. Adjusting means according to claim 2 in which the said spherical sleeve is provided with a pin engaging a notch in the said front collar with a view to preventing the telescope tube from rotating about its axis.

5. In a telescope, adjusting means comprising, in combination, a front collar secured to a support and forming a socket accommodating a spherical sleeve surrounding the telescope tube, a rear collar mounted on said support and provided with a set of two bosses with horizontal faces and a set of two bosses with vertical faces, two eccentric rings idly mounted on the said telescope tube and each confined between one set of bosses, milled wheels integral with each of said eccentric rings and concentric with the telescope tube for actuating said rings.

6. Adjusting means according to claim 5, in which each milled wheel is provided with a graduated scale with which cooperates an index on the telescope tube.

ARMAND ANTOINE AUGUSTE AGÉNOR
DE GRAMONT.

REFERENCES CITED

The following references are of record in the file of this patent:

UNITED STATES PATENTS

| Number | Name | Date |
|---|---|---|
| 1,386,027 | Reynolds | Aug. 2, 1921 |
| 2,127,302 | Langsner | Aug. 16, 1938 |
| 963,559 | Hines | July 5, 1910 |